(12) United States Patent
Semeniuk et al.

(10) Patent No.: US 11,777,874 B1
(45) Date of Patent: Oct. 3, 2023

(54) ARTIFICIAL INTELLIGENCE CONVERSATION ENGINE

(71) Applicant: Carvana, LLC, Tempe, AZ (US)

(72) Inventors: Mikhail Semeniuk, El Cerrito, CA (US);
Hollin Wilkins, Freeville, NY (US);
Thomas Taira, Lafayette, CA (US);
Bernard Brenner, Austin, TX (US)

(73) Assignee: Carvana, LLC, Tempe, AZ (US)

( * ) Notice: Subject to any disclaimer, the term of this patent is extended or adjusted under 35 U.S.C. 154(b) by 408 days.

(21) Appl. No.: 16/711,902

(22) Filed: Dec. 12, 2019

Related U.S. Application Data

(60) Provisional application No. 62/779,737, filed on Dec. 14, 2018.

(51) Int. Cl.
| | |
|---|---|
| *G06F 40/30* | (2020.01) |
| *G06F 40/295* | (2020.01) |
| *H04L 51/02* | (2022.01) |
| *G06N 20/00* | (2019.01) |
| *G06N 5/04* | (2023.01) |
| *H04L 51/216* | (2022.01) |
| *H04W 4/14* | (2009.01) |

(52) U.S. Cl.
CPC ............... *H04L 51/02* (2013.01); *G06F 40/30* (2020.01); *G06F 40/295* (2020.01); *G06N 5/04* (2013.01); *G06N 20/00* (2019.01); *H04L 51/216* (2022.05); *H04W 4/14* (2013.01)

(58) Field of Classification Search
CPC .......... G06F 40/295; G06F 40/30; G06N 5/04; G06N 20/00

USPC ........................................................ 704/009
See application file for complete search history.

(56) References Cited

U.S. PATENT DOCUMENTS

| | | | | |
|---|---|---|---|---|
| 10,219,122 | B1* | 2/2019 | Scanlon et al. ......... | H04W 4/025 |
| 10,492,039 | B1* | 11/2019 | Scanlon et al. ......... | H04W 4/025 |
| 10,581,790 | B2* | 3/2020 | Billingslea et al. .. | H04L 51/046 |
| 10,949,616 | B1* | 3/2021 | Shenoy et al. ......... | G06Q 10/109 |
| 2013/0060793 | A1* | 3/2013 | Bandyopadhyay et al. ................ G16H 10/60 707/755 |
| 2016/0352656 | A1* | 12/2016 | Galley et al. .......... | H04L 51/02 |
| 2017/0180294 | A1* | 6/2017 | Milligan et al. ..... | H04L 51/216 |
| 2017/0185904 | A1* | 6/2017 | Padmanabhan et al. . | G06N 5/04 |
| 2018/0032666 | A1* | 2/2018 | Sun et al. .............. | G16B 20/10 |
| 2018/0218374 | A1* | 8/2018 | Shah et al. ........... | G06Q 30/016 |
| 2018/0322403 | A1* | 11/2018 | Ron et al. .............. | G06Q 10/10 |
| 2018/0359199 | A1* | 12/2018 | Nguyen et al. ........ | G06N 20/00 |
| 2018/0367483 | A1* | 12/2018 | Rodriguez et al. .. | H04L 51/046 |
| 2018/0367484 | A1* | 12/2018 | Rodriguez et al. .... | H04L 67/75 |
| 2019/0228105 | A1* | 7/2019 | Ma ..................... | G06F 16/9577 |
| 2019/0251417 | A1* | 8/2019 | Bennett et al. ........ | G06F 40/00 |
| 2019/0325863 | A1* | 10/2019 | Martin ............. | G06F 16/90335 |
| 2019/0327330 | A1* | 10/2019 | Natarajan et al. ..... | G10L 15/22 |
| 2020/0073938 | A1* | 3/2020 | Losalka et al. ....... | G06F 40/295 |
| 2020/0401661 | A1* | 12/2020 | Kota et al. ............. | G06N 20/00 |

\* cited by examiner

*Primary Examiner* — Akwasi M Sarpong
(74) *Attorney, Agent, or Firm* — THE MARBURY LAW GROUP, PLLC

(57) ABSTRACT

Systems, methods, and devices of the various embodiments may provide an artificial intelligence (AI) conversation system, such as an AI driven virtual assistant, that can participate in automated conversations with users. The AI conversation system may be configured to respond to user inquiries or requests and implement conversations to achieve tasks.

12 Claims, 9 Drawing Sheets

ARTIFICIAL INTELLIGENCE CONVERSATION ENGINE

RELATED APPLICATIONS

This application claims the benefit of priority to U.S. Provisional Application No. 62/779,737 entitled "Artificial Intelligence Conversation Engine" filed Dec. 14, 2018, the entire contents of which are hereby incorporated by reference for all purposes.

FIELD

The present disclosure relates generally to systems and methods for automated conversations. More particularly, the present disclosure relates to an artificial intelligence-based conversation engine. Even more specifically, the present disclosure relates to an artificial intelligence-based conversation engine trained to use intent to provide a natural conversation experience.

BACKGROUND

When people communicate with an organization, they generally expect a prompt response and follow up. Those tasked with servicing external requests are becoming increasingly overwhelmed by the number of communications they receive and leave many communications unanswered. For example, retailers, agents, and brokers of various industries (i.e. automotive, real estate) rely on inbound customer leads (inquiries or requests for more information or management of events that can lead to a sale) for generating sales, but may leave many leads unanswered due to the overwhelming volume. An automotive retailer, for example, may receive hundreds of leads per day via email, short message service (SMS) and various other messaging systems (e.g., Facebook Messenger). Their growing challenge is the ability to respond to every lead with accurate information in a timely manner. Due to the volume and complexity of requests, providing prompt and accurate responses for every lead has become unattainable for most retailers without additional headcount and cost. In addition, there is an exponential challenge of providing adequate follow-up to maintain or improve the likelihood of sale.

Consumers that submit leads to said retailers and brokers not only have an expectation of prompt response and follow-up, but they also want to choose their method of communication (email, SMS, messenger, phone) and for communication to happen on their schedule. Furthermore, they expect that the initial response to address the key task or question they originally inquired about. Unfortunately, the consumer experience often fails to meet these expectations.

SUMMARY

Systems, methods, and devices of the various embodiments may provide an artificial intelligence (AI) conversation system, such as an AI driven virtual assistant, that can participate in automated conversations with users. The AI conversation system may be configured to respond to user inquiries or requests and implement conversations to achieve tasks.

Various embodiments may include methods for automated conversations with users by an AI conversation system including extracting from a received message text in a conversation one or more entities included in the received message text, determining a state of the conversation, and constructing a response to the received message text based on the extracted one or more entities and the determined state of the conversation. In various embodiments, the method may further include applying to the received message text one or more machine learning models to determine data associated with the received message text, wherein constructing the response to the received message text based on the extracted one or more entities and the determined state of the conversation comprises constructing the response to the received message text based on the extracted one or more entities, the determined state of the conversation, and the determined data associated with the received message text. In various embodiments, at least one of the one or more machine learning models may be an intent extraction model trained to classify the received message text into one or more intent classes and the determined data may include the one or more intent classes. In various embodiments, at least one of the one or more machine learning models may be a topic category model that has been trained to compare a text feature vector of the received message text and a set of reference feature vectors representing topic categories to determine a highest similarity reference feature vector to the text feature vector and the determined data may include a topic category represented by the highest similarity reference feature vector. In various embodiments, at least one of the one or more machine learning models may be an intent model that has been trained to compare the text feature vector of the received message text and a set of reference feature vectors representing defined intent classes to determine a highest similarity reference feature vector to the text feature vector and the determined data may include an intent class represented by the highest similarity reference feature vector. In various embodiments, the extracted one or more entities may include one or more general entities, one or more industry specific entities, or one or more learned entities. In various embodiments, the method may further include determining whether a state change has occurred during the conversation based at least in part on a state change rule, changing the conversation to a second state in response to determining that a state change has occurred, and constructing another response based at least in part on the extracted one or more entities and the second state of the conversation. In various embodiments, the conversation may include one or more text messages and the received message text may be one or more sentences of at least one of the one or more text messages.

Further aspects may include a device having a processor configured to perform one or more operations of the methods summarized above. Further aspects may include a non-transitory processor-readable storage medium having stored thereon processor-executable instructions configured to cause a processor of a device to perform operations of the methods summarized above. Further aspects may include a device having means for performing functions of the methods summarized above.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
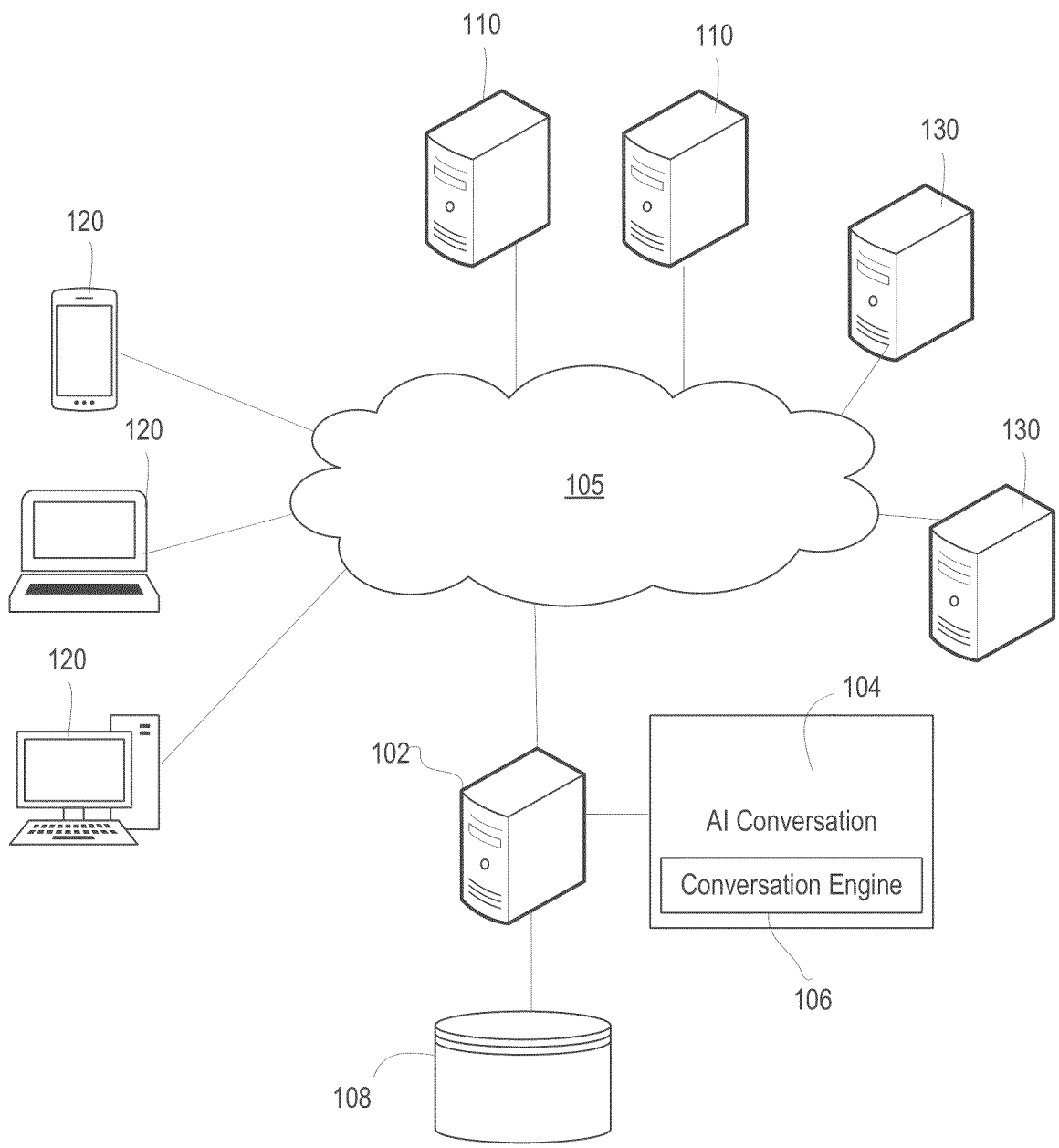
FIG. 1 is a diagrammatic representation of one embodiment of a network topology.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a memory device, such as a computer hard drive), hardware circuitry or the like, or any combination.

To relieve the burden on internal agents, an organization may use an automated system, such as an interactive voice response (IVR) system or web site, to provide information to external users. These systems are highly scripted with the external user explicitly choosing which information to receive next from visual or auditory menu prompts. The external user must navigate through the script or site structure (or use search functionality) to access the information the user is seeking and the information is provided in the context of the session in which the information is requested.

While such systems are helpful in providing repetitive information, they are typically designed for a particular communications channel and to handle relatively simple requests (e.g., request for particular menu item, page or query result). More complex requests are often routed to an employee. For example, an IVR may connect a caller to a call center attendant to answer a question not adequately answered by the script or a web site may provide a chat feature so that a site visitor can ask questions of an employee.

There is thus the need for an automated system that solves the growing challenge of timely and relevant responses that works with a requestor's schedule and chosen communication medium.

Embodiments described herein provide an artificial intelligence (AI) conversation system, such as an AI driven virtual assistant, that can participate in automated conversations with users. The AI conversation system is configured to respond to user inquiries or requests and implement conversations to achieve tasks. The AI conversation system can analyze incoming text-based messages for intent and respond and/or put the user through a flow to complete a task (e.g., a flow where the AI conversation system asks questions to complete a task).

Embodiments of an AI conversation system provide a number of advantages over prior systems. One embodiment provides an advantage by providing a more natural conversation experience for the user because the responses/flows provided by the AI conversation system are based on intents extracted from the user messages.

One embodiment provides another advantage by utilizing a machine learning models trained on tokenized training data. Such a machine learning model reduces the amount of data required to train the machine learning model.

One embodiment provides another advantage by using an intent extraction model that comprises a series of models to extract intent. The series of models make it easier to classify training data and thus increase the accuracy of the system.

Embodiments provides another advantage by providing repeatable determination of intents.

Conventional automated call systems are not capable of handling the complexity of requests that occur in many conversations. Additionally, conventional automated call systems do not provide timely and relevant responses in conversations, especially when the conversations vary from a script of pre-prepared answers used by conventional automated call systems. Systems, methods, devices, and non-transitory media of the various embodiments may provide an artificial intelligence conversation system that solves these and other problems with conventional automated call systems. Various embodiments may provide an artificial intelligence conversation system, including a conversation engine configured to assign an initial state to a conversation, and determine a response to send a user in the conversation based at least in part on the initial state. In various embodiments, the conversation engine may be further configured to determine whether a conversation state change has occurred during the conversation based at least in part on a state change rule, change the conversation to a second state in response to determining that a state change has occurred, and determine a response to send a user in the conversation based at least in part on the second state. In various embodiments, the conversation engine may include a set of machine learning models. In various embodiments, the set of machine learning models may include one or more of an intent extraction model, a response intent model, a model identifying products/services, a model to identify names, and a model to determine conversation data. In various embodiments, the conversation engine may be configured to extract entities from text messages comprising the conversation. In various embodiments, the entities may be one or more of general entities, industry specific entities, and learned entities. Artificial intelligence conversation systems according to the various embodiments may be configured to handle the complexity of requests that occur in conversations. Additionally, artificial intelligence conversation systems according to the various embodiments may provide timely and relevant responses in conversations.

Embodiments of the systems and methods of the present invention may be better explained with reference to FIG. 1, which depicts one embodiment of a topology which may be used to implement embodiments of the systems and methods of the present invention.

The topology of FIG. 1 includes an artificial intelligence (AI) conversation system 102 coupled through network 105 to computer systems 110, computer systems 120 and computer systems 130. Network 105 may be for example, a wireless or wireline communication network such as the Internet or wide area network (WAN), publicly switched telephone network (PTSN) or any other type of communication link.

In general, computer systems 110 may be controlled by organizations that provide products or services to end users (e.g., customers). For example, computer systems 110 may be computer systems provided by retailers, agents or brokers and computer systems 120 may be devices used by customers to communicate with the organizations or AI conversation computer system 102—for example, computer systems 120 may be devices used by customers to communicate with the organizations via email, SMS, web applications or web sites provided by computer systems 110—and computer systems 130 may be information provider computer systems controlled by 3$^{rd}$ party information providers that provide information regarding products, services or other information.

AI conversation system 102 may comprise one or more computer systems with central processing units executing instructions embodied on one or more computer readable media where the instructions are configured to perform at least some of the functionality associated with embodiments of the invention. These applications may include AI conversation application 104 comprising one or more applications (instructions embodied on computer readable media) configured to implement a conversation engine 106 and other components of a conversation system.

AI conversation system 102 may provide a wide degree of functionality including utilizing one or more interfaces configured to, for example, receive and respond to messages and other information from computer systems 110, 120 or interface with computer systems 130 to obtain data; provide data obtained, or determined, by AI conversation system 102 to any of computer systems 110, 120, 130. It will be understood that the particular interface utilized in a given context may depend on the functionality being implemented by AI conversation system 102, the type of network 105 utilized, the type of data to be obtained or presented, the time interval at which data is obtained, the types of systems utilized at the various organizations, etc. Thus, these interfaces may include, for example web pages, web services, email interface, SMS interface or almost any other type of interface which it is desired to utilize in a particular context.

In general, then, using these interfaces, AI conversation system 102 may obtain data from a variety of sources, including one or more of computer systems 110, computer systems 120, computer systems 130 and store such data in data store 108. This data may be then grouped, analyzed or otherwise processed by AI conversation system 102.

AI conversation system 102 is configured to engage in an automated conversation with users (e.g., customers) using the intents expressed in messages from an information requestor to respond to the user and create a natural conversation.

According to one embodiment, AI conversion system 102 receives leads that include a name, contact information (e.g., phone number and/or email) and a written message (text message) of intent (e.g., "I'd like to schedule an appointment") from a computer system 110 or other computer system. The text message may come from, for example, an email, a website, a phone call inquiry, an SMS, a messaging app message (e.g., iMessage, WhatsApp), a messaging platform like Facebook messenger, or a voice mail. For example, a customer may call a retailer and the retailer may enter a customer lead in computer system 110 where the lead includes a written message based on a conversation or voice mail from the customer. In another embodiment, a computer system 110 may store leads that contain written messages based on text box input from the website. As another example, computer system 110 may store text from an email or SMS message received by computer system 110 in a lead. The computer system 110 may provide the leads to conversation system 102.

Information can be delivered to AI conversation system 102 in either a structured or unstructured manner. For example, AI conversation system 102 may receive structured leads via email in an agreed upon format, via an API or other mechanism. Using the example of an automotive retailer, leads may be provided to AI conversation system 102 according to the industry standard Automotive Data Format (ADF). Such leads will often have specified information for, e.g.: Customer: name, phone number, email, location; Dealership: name, location; Vehicle of interest: VIN, Stock number, Year/make/model/style description; Customer request: this is typically a written note (free form text-based message) from the customer that describes their initial intent or questions.

Unstructured information (e.g., unstructured leads) can be received by a user sending a message directly to AI conversation system 102 via email, SMS or other message format.

AI conversation system 102 is configured to identify the intents of users based on a text inputs, identify the questions a user will likely have, determine a best channel of communication for the user, send the user a reply, which may answer a question included in the message and/or question that the user is predicted to have, and continue to engage in the conversation with the user as the user sends further messages.

According to one embodiment, AI conversation system 102 (a) learns user's (e.g., a customer's) intents as they relate to shopping for a specific product or service; (b) integrates product, service and/or transaction (e.g., financing, incentives, insurance, warranty) information that is needed to answer user's requests; (c) responds to the user's shopping, service, and transaction related questions and/or puts the user in a flow to complete a task; and (d) keeps track of the context and the history of the conversation to deliver immediate responses and follow up that resembles a coherent, multi-touchpoint conversation that a consumer would otherwise have with a diligent and knowledgeable sales person, customer service agent, sales person or broker.

Based on a received lead (or other message), the conversation system 102 may initiate and participate in a conversation with a user (e.g., a customer or other user). In one embodiment, AI conversation system 102 communicates with computer devices 120 for subsequent messages in a conversation even if the lead was received from a computer system 110.

Initiating a conversation may include creating a conversation object to hold data relevant to the conversation. In one embodiment, the conversation object may include entries in one or more database tables. A conversation may be identified by a unique identifier and/or some unique combination of information. For example, a conversation may be identified by an organization name/id, a user name and contact information (e.g., phone number, email address, messenger id) so that messages from the same user on different channels with respect to the same organization (e.g., retailer) can be identified as being part of the conversation initiated for that user.

Conversation engine 106 may record, for each conversation, information provided by the user (e.g., customer), data obtained or generated by conversation engine 106, a history of intents and other data. For purposes of discussion, "conversation data" of a conversation refers to data maintained for the conversation. The conversation data can include data in volatile memory that has not yet been committed to persistent storage and data committed to persistent storage).

A conversation may be in one of a plurality of predefined states. When a conversation is initiated, conversation engine 106 assigns the conversation an initial state. Conversation engine 106 is configured with state change rules that define when conversation state changes occur. The conversation state and/or other information may be used to determine a response to send to a user.

Conversation engine 106 is configured with a set of machine learning models. In particular, conversation engine 106 includes an intent extraction model trained to classify written messages (or portions thereof) into defined intents. Further, conversation engine 106 may include a response intent model to predict what information a user may want to know next. Further, conversation engine 106 may include models to identify products/services based on information provided by a user (e.g., models to identify vehicles in an automotive implementation), models to identify names from text and other models to extract or determine information based on conversation data.

Conversation engine 106 is configured to apply the intent extraction model to a written message to output one or more intents for the message. Further conversation engine 106 can include rules that are used to determine additional data to look up based on the intent or other conversation data.

Conversation engine 106 can be configured with response intents that are associated with response templates or instructions to generate response content for various communication media and rules to determine a response intent based on a message intent and a conversation state. In some embodiments, a response intent model may be applied to determine a response intent for a message.

Based on the response intent determined for a message, conversation engine 106 can generate a response. This may include populating a template response with conversation data or executing response generation code. Conversation engine 106 can communicate the response to the user via a selected communication channel.

Figure 2:
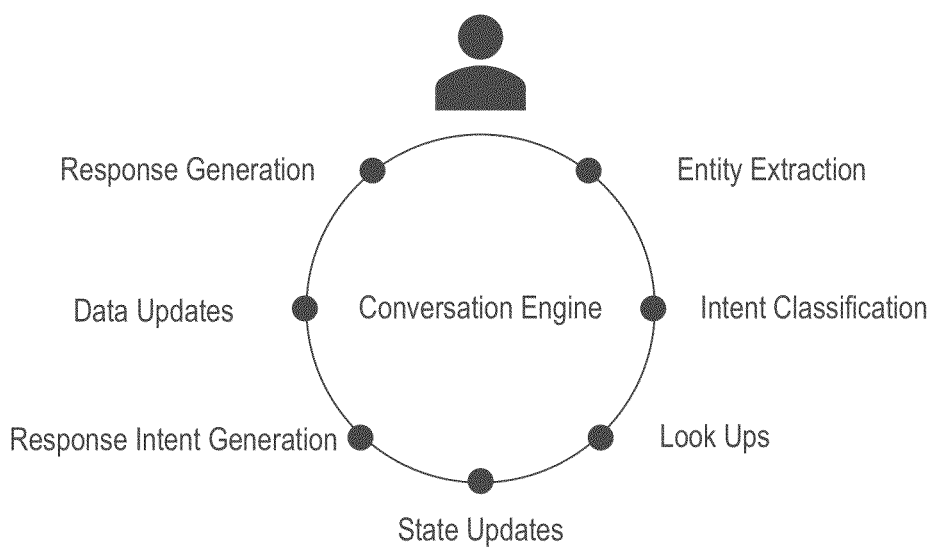
FIG. 2 is a diagrammatic representation of one embodiment of processing a message.

Turning to FIG. 2, FIG. 2 is diagrammatic representation of one embodiment of processing user message text (e.g., free form text. For the sake of example, processing of messages is primarily described using the example of processing messages related to an automotive retailer; however, the skilled artisan will appreciate that conversation systems according to the teachings herein can be implemented to provide automated conversations in a variety of industries and applications. Further, while the user is primarily referred to as a "customer" below, it should be understood that messages from other types of users may be processed.

According to one embodiment the conversation engine (e.g., conversation engine 106 of FIG. 1) includes a set of components that are executed in sequence to process a message. (Not illustrated in FIG. 2 is the step of receiving the message.

Entity Extraction

The conversation engine is configured to extract certain entities from the text message. According to one embodiment, the entities include three types: 1) General: includes entities such as date/time, dollar amount, location names, and other non-industry specific entities; 2) Industry (or Domain) Specific: includes industry (or domain) specific words or phrases. Using the example of a conversation engine for the automotive industry, industry specific items may include make/model/trim names; and 3) Learned: A combination of general and/or industry specific entities that depend on context. Colorado is an example of a learned entity as Colorado can be a place name or a model name (Chevrolet Colorado) and the correct entity depends on context of the conversation and the sentence in which it is used. One or more models may be trained on training data in which learned entities are tagged to learn how to recognize such entities.

One example of a set of general and industry specific entities is provided in Table 1.

| TABLE 1 | | |
|---|---|---|
| General Entities: | | |
| | General: | |
| | | Distance |
| | | Duration: Term Length |
| | | Email |
| | | Phone Number |
| | | Numeral |
| | | Date/Time |
| | | URL |
| | | Name |
| | Locations: | |
| | | Business Name |
| | | City |
| | | State |
| | | Country |
| | Amounts of Money: | |
| | | General: $x Dollars |
| | | Payment Amount: $x Dollars/Month |
| | | Purchase Type: Cash/Finance/Lease |
| Industry Specific Entities: | | |
| | Automotive: | |
| | | VIN |
| | | Stock Number |
| | | Model Year |
| | | Make |
| | | Model |
| | | Style |
| | | Body Type |
| | | Transmission |
| | | Engine |
| | | Fuel Type |
| | | Power Type: Gas/Hybrid/Electric |
| | | Vehicle Type: New/Used/Certified |
| | | Truck Bed Type |
| | | Truck Cab Type |
| | | Wheel Size |
| | | Exterior Color |
| | | Interior Color |

-continued

| Industry Specific Entities: | | |
|---|---|---|
| Automotive: | | |
| | | Interior Trim |
| | | Features & Options |
| | | Odometer |
| | | Safety Rating |
| | Other | |
| | | APR |

As will be appreciated by the skilled artisan, entities may be defined for various industries depending on implementation.

Each extracted entity has an associated token with which it is replaced in the message being processed. For example, if the original message was "I would like to test drive the black ford focus at 10am tomorrow", the tokenized version of the message may be "I would like to test drive the {exterior color} {make} {model} at {time} {date}."

Extracted entities are saved in conversation memory (that is, as conversation data) for future operations. In the example above, the conversation engine saves the vehicle-related entities of make and model and time-related entities of tomorrow (translated to an actual date) and the time.

Intent Extraction

The conversation engine includes a machine learning model pipeline comprising an intent extraction model and pre-processing steps to normalize data and extract features that are fed into the intent extraction model.

Intent extraction is performed by the intent extraction model, which is trained to classify different intents based on the input text, relationships between words, sentence structure, entities within the text, conversation state, and context. In one embodiment, the intent extraction model is configured to determine an intent for each sentence in a message. Thus, a message may have multiple intents.

According to one embodiment, the intent extraction model includes a plurality of models. For example, the intent extraction model may include a first model configured to classify sentences from messages into categories (intent classes) and a set of category specific intent models to classify the categorized sentences into intents for the respective category.

Figure 3:
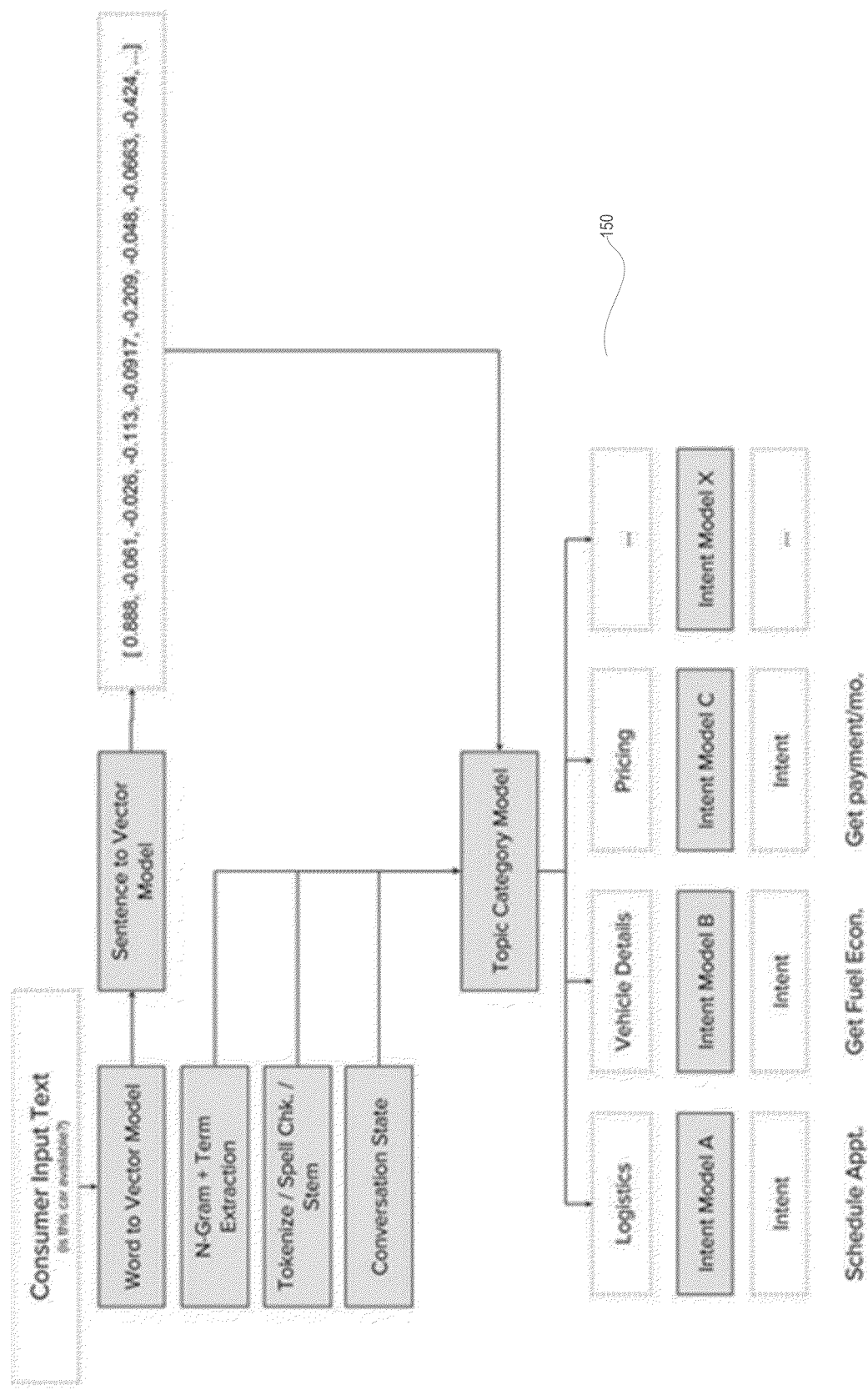
FIG. 3 is a diagrammatic representation of one embodiment of training an intent extraction model.

FIG. 3, for example, illustrates an intent extraction model 150 that includes a Topic Category Model to classify sentences from messages into intent classes (Logistics, Vehicle Details, Pricing ...) and Intent Models to further classify the sentences into intents in a category.

For example, the Topic Category Model may be trained such that it categorizes the sentences "What time do you open?", "I need to schedule an appointment" as Logistics and Intent Model A may be trained such that it further classify "What time do you open?" as a "Business Hours" intent, but "I need to schedule an appointment" as a "Schedule Appt." intent.

Thus, according to one embodiment, the intent extraction model first attempts to predict a category of intent (intent class) and then the specific intent. While only one intent is illustrated for each intent class, there may be many intents for each intent class.

In one embodiment, the Topic Category Model is configured to compare an input feature vector to reference set of feature vectors representing defined intent classes to determine the reference feature vector that has the highest similarity to the input feature vector. Further, an Intent model can be configured to compare an input feature vector to a reference set of feature vectors representing defined intents to determine the reference feature vector representing an intent that has the highest similarity to the input feature. Thus, an intent category and intent can be determined for an input feature vector. In some implementation, the models may be configured to output a probability of match for some number of intent classes or intents.

In the embodiment of FIG. 3, the intent extraction model includes two levels (Topic Category, Intent). In other embodiments, however, the intent extraction model may include additional levels (e.g., Topic Category Model, Sub Category Model, Intent). For example, a Financing category may include a model to further categorize a sentence into Leasing and Purchase subclasses with the Leasing and Purchase subclasses each having a respective Intent Model.

In some cases, a model may return probabilities for multiple classes or intents. Rules may be established to select the category or intent (e.g., select the highest probability or other rule).

Moreover, because intent extraction is done on a per sentence basis in some embodiments, a message may have intents determined for each sentence.

Training

The machine learning models can be trained and retrained using historical message data. For example, historical data sets, such as ADF data, may be collected from 3rd party sources. Further, AI conversation system 102 collects and stores conversation data from its ongoing operations (conversations between the conversation system 102 and customers, event/actions tagged on websites or other data) that can be used in training data sets.

According to one embodiment, the machine learning models are trained on per sentence data. For sentences extracted from conversations that happen on the AI conversation platform (e.g., conversations facilitated by AI conversation system 102), the sentences can be associated with a conversation state, as well as a history of prior states and intents. Put another way, various pieces of conversation data may be used as features when training on sentences from conversations on the conversation platform.

A team of domain-level experts tag each sentence in the historical data set with an intent class as well as an intent. An intent class is a higher order classification of individual intents. For example, intents about a specific vehicle (i.e. what options does it have, what's the transmission, etc.) are all in the Specific Vehicle intent.

A training data set can thus be defined that includes individual sentences and assigned intent class and individual intents. In some cases, the training data set may also include, for some or all the sentences in the training data set, a history of the conversation (e.g., the conversation state when the sentence was received and a history of prior states and intents that had been answered in the respective conversation in which the sentence was recorded).

With further reference to FIG. 3, "Consumer Input Text" refers to sentences in the training set. Each sentence will be tagged with an intent class (e.g., (Logistics, Vehicle Details, Pricing ...) and intent. In a model that supports more levels, each sentence may be tagged with an intent class, one or more levels of subclasses and an intent.

Data normalization: data normalization includes operations such as stemming of sentences, the process of converting words to their roots (e.g., purchased -> purchase), spelling correction. Certain words, such as "a" or "the" may be removed, words such as "I" or "we" combined or other processing to reduce the number of words considered in intent extraction. In some cases, rules may be applied to analyze the grammar and/or working of sentences to determine if a sentence should be broken into multiple sentences.

Data normalization may include tokenization as described in the Entity Extraction section. That is particular words or phrases in a sentence (general, industry specific or learned entities) are replaced with corresponding tokens. It can be noted that the use of tokens in the manner can reduce the amount of training data required to accurately train a model.

Feature Learning: each word/term in a normalized sentence is transformed into an n-dimensional vector representation, where the vectors of similar/alike words/terms are directionally similar. This also includes a post processing step of turning a sequence of word vectors into a single vector to represent a sentence.

Feature Engineering: This is the process of explicitly defining features. Various embodiments extract features like n-grams, common terms and select the ones that have predictive power of intent class and intent.

Classifier Training: A variety of models (e.g., classifiers) are trained to predict topic categories. According to one embodiment, each model is evaluated for accuracy and error rate using metrics like precision, recall and summarized as an F1 score. The best performing model is selected as the Top Category Model. Further, intent models are trained for each category. A variety of models (e.g., classifiers) are trained to predict intent within a category. According to one embodiment, each model is evaluated for accuracy and error rate using metrics like precision, recall and summarized as an F1 score and the best performing model within a category is selected as the Intent Model for the category. An intent extraction model comprising the selected Topic Category Model and Intent Models is deployed in AI conversation system 102. Examples of models that may be tested included, but are not limited to regressions trees, random forest classifiers, or various neural networks or deep learning models.

According to one embodiment, the training machine learning model pipeline is serialized and deployed as the production machine learning pipeline. The machine learning model pipeline includes the intent extraction model and the sequence of pre-processing steps that normalize the data, and extract features that are fed into the intent extraction model. According to one embodiment, the pipeline may be serialized using an open-source serialization format and execution software such as MLeap. The type of serialization allows for instant deployment of the entire pipeline without any need to change or develop new code, which is often a bottleneck in organizations to deploying machine learning software. The type of serialization allows for instant deployment of the entire pipeline without the need to change or develop new code, which is often a bottleneck to deploying machine learning software.

As production operation of conversation system 102 continues, data from ongoing operation can be added to the historical data, the training set updated and the intent extraction model retrained.

Model Execution

When processing a message, the conversation engine executes the machine learning model pipeline. According to one embodiment, the output of intent extraction includes (a) the highest probability intent class, (b) the highest probability intent within the highest probability class and (c) the 2nd to N highest intent classes and intents along with their probabilities. Downstream operations may be dependent on the highest probability intent and intent class.

The conversation engine may include a variety of other models in addition to the intent extraction model. Which model is executed and the order in which it is executed can depend on the state of a conversation. For example, a customer's conversation may be in a state where the conversation engine needs the customer's name and has asked them a "what is your name question." In this scenario, the system may execute a model that is trained to recognize people's names. If a name is recognized, conversation engine can consider the task of collecting the customer's name complete. If a name is not recognized, the conversation engine can execute secondary models trained to recognize if the customer has replied with a different question or has replied to the conversation system 102 that they are not interested.

Data Lookup

Returning to FIG. 2, intents may be associated data lookups, such that the conversation engine perform various data look ups based on the intent determined for a message (e.g., the highest probability intent for the highest probability class). The conversation engine can fetch the data required to complete the customer's request if the intent is to get information about the product, service or business.

For example, the intent for the sentence "I would like to test drive the {exterior color} {make} {model} at {time} {date}" may be determined to be "Book Test Drive" as output by the intent extraction model. In order to complete the intent, the conversation engine may retrieve the entity data from the conversation memory and perform the following lookups: a. Check that the requested date and time is within operating hours; b. Check that the requested vehicle (a) exists; (b) there is only one of them to avoid confusion about which vehicle they want to test drive; and c. Check that the requested vehicle is available for sales.

In order to complete lookups for an intent, various embodiments enrich the data to make it complete to answer all known consumer intents. Some example enrichment processes include: a. Exterior color: A lexicon has been built up of variations of how a specific color can be described. For example, Silver Metallic can be represented by its full name, but also by silver and metallic silver; b. Transmission: Manufacturers have distinct naming conventions and brand names for their transmissions. The conversation system is configured to automatically match various brands and descriptions to common types, providing our system the ability to easily categorize and search vehicles based on transmission type; c. Package Details: A vehicle may come with something called Technology Package, but that includes things like a backup camera and navigation system. Various embodiments enrich the data in such a way that when a customer searches for a navigation system, various embodiments present them with vehicles that contain the Technology Package; d. Incentives: Incentives often come as a form of rebate from the manufacturer or a discount from the retailer. Various embodiments extract and integrate various sources of incentives, offers, and discounts and apply those to specific vehicles to be able to address pricing-related questions and arrive at an accurate transaction price; and e. Financing / Lease Offers: Financing and Lease APR rates often are provided by financial institutions linked to manufacturers. Various embodiments integrate with various sources of finance and lease data with individual vehicles to be able to answer what rates and payments are available on a specific piece of inventory.

The conversation system also maintains other types of databases, such as information about the dealer, which includes, for example, the dealer's: a. Operating hours for sales, parts and service teams; b. Names of sales, service, and finance staff; c. Dealership perks, like whether they offer free oil changes, and have a return policy; and d. Information about ancillary products that dealers offer, like extended warranties, service contracts and trade-in appraisal tools.

Thus, the conversation engine can be configured to perform a variety of data lookups depending on the intent expressed in a message as determined based on the output of the intent extraction model.

State Updates

The conversation engine system is configured with a number of defined conversation states and maintains a state for each conversation. Each state may be associated with a set of code that is executed for that state. For example, a conversation engine configured for conversations related to automotive retailer may include states, such as: Initial State; Specific Vehicle: A customer is asking about a specific product (vehicle); Search: A customer is asking a search question; and Scheduling: A customer is asking to schedule an appointment.

The conversation engine may use the state of a conversation and message intent to answer customer's questions as well as to determine questions to ask of the customer in order to complete a task (e.g., search for a specific vehicle).

As discussed below, the conversation engine is configured to use the state of the conversation and message intent to determine the logical answer to a question. Consequently, the question of "How much does the ford focus cost?" from a customer may cause the conversation engine to generate different responses depending on the conversation state, for example: a. Search state: The logical answer would describe the price range of ford focus' available; and b. Specific Vehicle state: The logical answer would tell the customer the price of the vehicle as well as any associated fees and offers available on that specific vehicle.

A conversation state may also be used by conversation engine to determine a work stream (a flow) of questions to ask the customer. For example, if a customer asks a search question of "What Ford Focus' do you have?" the system can logically (a) answer how many matching vehicles are available and (b) prompt the customer for more information to help narrow to a specific vehicle (e.g., are there specific colors that interest you).

States are predetermined for every application of conversation system 102 and can be configured differently depending on requirements. According to one embodiment, there are two groups of states defined in the conversation engine: Reactive: In this type of a state, the conversation engine is listening for requests from the customer; and Proactive: In this type of a state, the conversation engine is asking questions of the customer to help complete some pre-determined task (e.g., to schedule an appointment the system would ask the customer preferred date and preferred time).

The conversation engine is configured with state rules to determine when to transition from one state to another (e.g. to transition a conversation from State A -> State B). The state transition rules may be based on a variety of factors, including but not limited to: The intent(s) of the customer's message currently being processed/user's most recent message in a conversation; Entities contained in the customer's current or past message; The history of the conversation; and Whether the transition from A -> B is allowed.

For example, according to one example rule, to transition from Specific Vehicle -> Search state, the intent of the input text has to be related to a Search intent, as determined by the intent extraction model, and at least one vehicle-related entity has to be provided in the input text.

Based on the state transition rules, each state has a set of intents that keep the conversation in that state and other intents that cause the conversation to transition out of that state.

Some proactive states may have special properties such that once the user completes all of the tasks required, will not end up in that state again. For example, if a customer requests the best price is for a specific product, but in order for the system to provide the best price it needs to collect information about the customer, the system may go into a Product Pricing state, where the conversation engine will ask the customer a series of questions. An example set of questions that the system may need answers to in order to provide a price on a new vehicle is: Whether the customer is a recent college graduate: to identify manufacturer offers targeted at recent college grads; Whether the customer is an active duty military member: manufacturer and certain financing institutions have special offers for them; and Whether the customer will be paying cash, financing or leasing: some manufacturers have special offers based on payment type.

Once the answers to those questions are gathered, the system does not ask the customer those questions again to answer pricing-related questions.

Response Intent Generation

The conversation engine is configured with a set of response intents. Each response intent may have an associated set of data elements that specifies the data required to generate responses based on the response intent. Each response intent may be associated with response templates or response generation code to generate responses for various transport media.

According to one embodiment, response intent generation is performed by two systems of the conversation engine. The first is a rules-based system that considers the state and context of the conversation, the incoming intent(s) from the current message and/or stashed intents. As discussed above, a message may have multiple intents (for example a multi-sentence message that asks multiple types of questions) and the conversation engine may generate multiple response intents for the message.

The second is a classifier model (response intent model) that uses data extracted from the conversation to predict what a consumer may want to know or do next. This model can be used when there is no clear intent or no intent at all from the consumer.

According to one embodiment, the conversation engine maintains a dataset that tracks the following information as features (i.e., dependent variables): Last 1 to N requested intents, where N represents the number of messages received from the customer; Product/services information: For example, vehicle information, such as structural and pricing components of a vehicle in which the customer is interested (as determined based on the conversation) or structural and pricing components of vehicles for which the customer has searched; and Communication medium: email / sms / messaging application.

The response intent model is trained to use some or all of the above information (or other information) to classify the data set as corresponding to a response intent from a plurality of response intents. The conversation engine uses such information to predict what the next intent / question that the customer will have. If a message comes through with no clear intent, the conversation engine can rely on the predicted intent of the response intent model to send a reply that answers the customer's next likely question.

According to one embodiment, examples of response intents that may be produced by the conversation engine included, but are not limited to: 1) Informational Intents: An information intent corresponds to answering a customer's question. If a customer asks "what options does the vehicle have?" the system would (a) check if it has the data needed to answer that customer intent and (b) check if that answer makes sense given the state of the conversation and then output an intent to answer a question about a specific vehicle's options; 2) Calls To Action Intents: The conversation engine generates these response intents if the system needs to get information from the customer to complete a task. For example, the conversation engine may be configured to generate a call to action intent to get the preferred date and time for a test drive appointment if that information is not already in the conversation data; and 3) Conversational Intents: These include intents for greetings, compliments, thank you, etc.

As discussed above, a message may have multiple intents and, similarly, the conversation engine may generate multiple response intents for a message. The conversation engine can be configured with logic configured to: Check if answering all of the response intents generated for a customer message makes sense; and For each response intent generated for a customer message, check whether the conversation engine has already generated and sent the response associated with the response intent out to the customer.

Intent Stashing

In some cases, it may be desirable to respond to a subsequent message based on an intent from a previous message. For example, if the conversation is in a Search state but the user asks "What is the mpg?", (e.g., a "fuel economy" intent), it may not be appropriate to respond to a "fuel economy" intent when no vehicle is selected. However, it may desirable for conversation engine 102 to respond to the "vehicle price" intent when the conversation reaches the Specific Vehicle intent. To this end, conversation engine 106 may implement intent stashing rules to stash intents from a current message for responding to future messages. The rules-based system may consider the state of the conversation and stashed intents from prior messages when determining a response intent(s) for a current message.

Data Updates

During the course of a conversation, the conversation engine will record information received from a customer (e.g., in a lead or other message). Information is gathered using the intents and entities extracted from messages sent in the conversation. The conversation engine can be configured to use this information to make a decision about conversation state updates, build a profile of the customer, get a better understanding of the customer intents and preferences, what their vehicle preferences and other information requests are, and how best to communicate with them.

Examples of information collected during the course of interacting with a customer include, by way of example, but not limitation: Profile information - name, phone numbers, emails, address, contact preferences for time and communication medium; Inventory search requests - all search requests and search refinements are stored in a database; Specific vehicle interests - when a customer interacts with the system to gather information on a VIN, the conversation engine records which VINs the customer is interacting with; Scheduled appointments - the conversation engine records the type of appointment (test drive, financing information, trade-in, etc.) as well as date/time and the vehicle the appointment is about; and Timeline of interactions - whenever a piece of information about a customer is updated, the conversation engine stores the update in a timeline of interactions. The timeline includes messages sent through all communication medium, 3rd-party lead requests, click-tracking information, and any other interactions with the conversation engine.

According to one embodiment, data updates occur immediately before sending a response to the customer. The updates are tied tightly with the information sent with the response. For instance, if a customer is trying to schedule an appointment at 1PM tomorrow, the text may read "I have confirmed your appointment at 1PM tomorrow afternoon" and the data updates would update the appointment record to reflect the 1PM time. In order to ensure valid responses go out, the conversation engine first validates the data updates before committing them to the database and sending the response. In the appointment example above, this will ensure that the appointment slot was not taken in the time between generating the response and sending the response.

According to one embodiment, the process for sending a response and performing data updates is as follows: a. Generate the response text and any assets to go with it. In some cases, this may include populating response templates or executing response generation code associated with a response intent (e.g., for example a response intent may result in the conversation engine updating a search or taking other action to update data); b. Validate the data updates, if invalid, go back to step a. and generate a new response. If the data updates are valid, commit them to our databases; and c. Send the response through the communication medium.

Response Generation

Each response intent is associated with instructions to create a response. In configuring the conversation engine, the response text for each response intent can be edited (e.g., via a user interface).

As discussed above, each response intent can be associated with one or more of: a. SMS Text; b. Email Text; c. Messenger Text; and d. Assets: Web/Mobile pages, links, photos, videos to send along with the response.

In some cases, response intents may be associated with other types of response content and/or response generation code.

Depending on the communication medium, the appropriate response content (e.g., SMS text, email text, messenger text, assets) is selected and used to create a response.

In some cases, when generating a response, the template may be populated with information from the conversation or data requested by the user.

Communication Medium

The conversation engine can support a number of communication mediums, such as SMS/MMS, email, and web-based chat. These are not the only channels over which the conversation engine can interact with a customer. Any communication medium which provides an interface to both send and receive text-based messages can be integrated. The conversation engine will adapt to different communication mediums depending on the capabilities of the medium. For instance, communicating over FaceBook messenger allows the conversation engine to send images, hyperlinks, lists of vehicles, shortcut buttons and a variety of other rich content. Text-based messages are the bare minimum for integration, but the conversation engine can be responsive to richer messaging environments.

According to one embodiment, the conversation engine dynamically changes which medium it uses to communicate with a customer based on a number of factors such as: That last message received from the customer; The contact preferences set by the customer; Other factors like time of day, operating hours, and sales rep. availability; and The type of content requested. For example, a user requesting lots of photos over SMS may elicit a response over email, or a customer requesting a finance application may receive a link to a web page.

Figure 4:
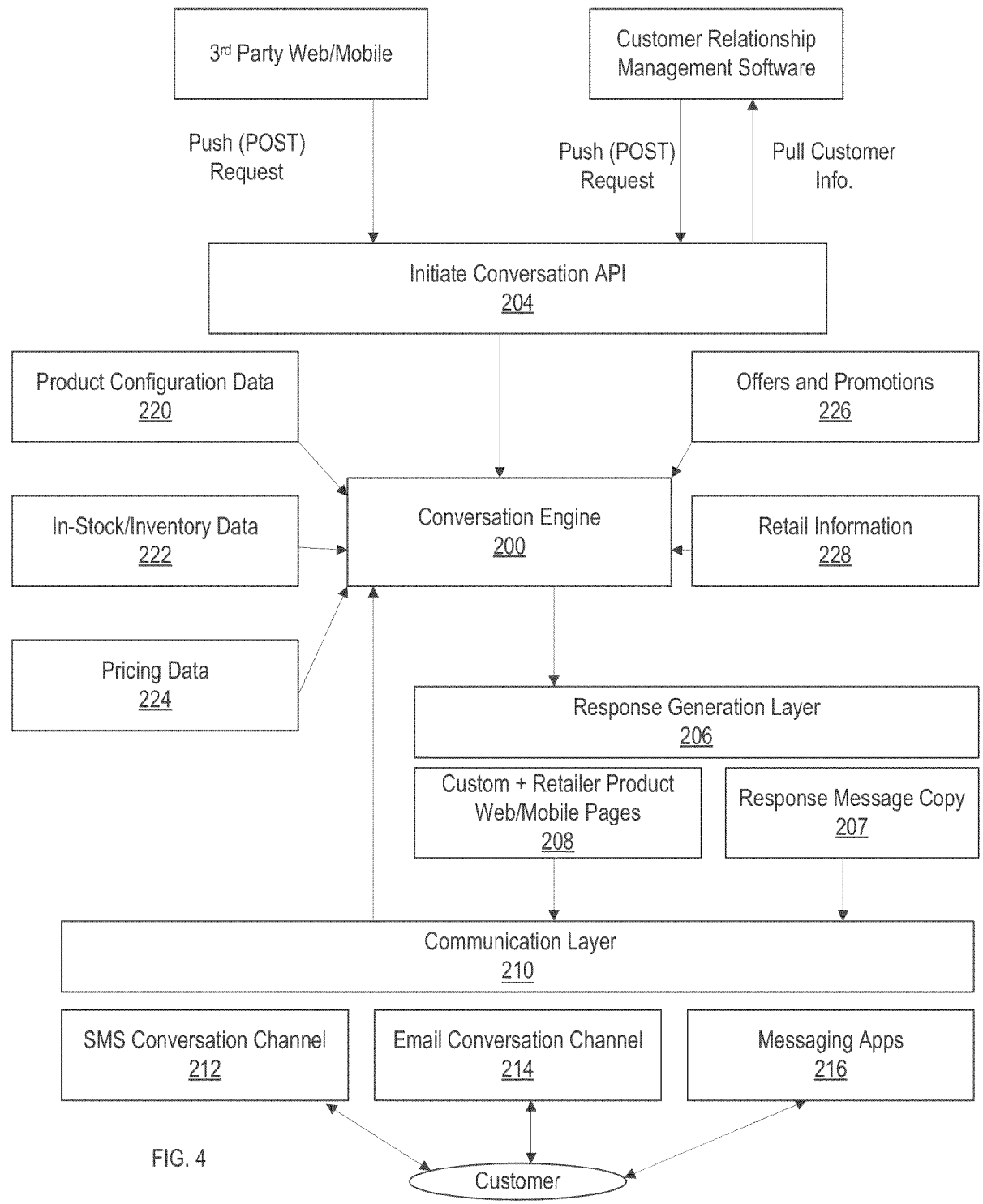
FIG. 4 is a diagrammatic representation of one embodiment of a conversation system.

FIG. 4 is functional block diagram illustrating one embodiment of an AI conversation application, such as AI conversation application 104. The AI conversation application includes a conversation engine 200, an initiate conversation API 204, a response generation layer 206 and a communications layer 210.

Conversation engine 200 may store or obtain a variety of data used during a conversation to respond to messages. Some examples include product configuration data 220 (e.g., vehicle make, model, trim, year, or other product configuration data), inventory data 222 (e.g. dealer inventory data), product pricing data 224, offers and promotions data 226 and retail information 228. One or more of 220, 222, 224, 226, 228 may be obtained from, for example, a dealer management system, 3$^{rd}$ party data vendors or other data sources. In some embodiments, data in 220, 222, 224, 226, 228 may be persistently stored by conversation engine 200 for processing messages. In other embodiments, conversation engine 200 may obtain data in 220, 222, 224, 226 or 228 as needed to process a message.

According to one embodiment, a 3$^{rd}$ party (e.g., a dealer or other 3$^{rd}$ party) may interface with the AI conversation application via API 204 using a web or mobile application. Further, in some embodiments, a 3$^{rd}$ party application (e.g., a dealers CRM system) may pull data from the AI conversation application via API 204.

In a particular embodiment, conversation engine 200 may receive leads from a web application, mobile application, CRM application or other application via API 204 and initiate conversations. For a lead, conversation engine 200 can initiate a conversation, determine an intent from the lead, determine a response intent, and output the response intent 206 to response generation layer.

Response generation layer 206 may access response content, such as response templates, associated with the response intents and generate web page content 208 and/or response message copy (text) 207 using the response templates and respective conversation data. In some cases, the web page content 208 may include search results pages, links to retailer (e.g., dealer) pages or other content obtained from various systems.

Communications layer 210 may combine web page data 208 and response message copy (text) 207 into a response. The communications layer 210 may implement rules to select a channel (e.g., an SMS conversation channel 212, Email conversation channel 214, messaging app channel 216) via which to provide a response to a customer (or other user) and send the response to the appropriate service.

Communications layer 210 may also receive communications from the customer and forward messages to conversation engine 200 for further processing.

It can be noted that an AI conversation application may run a service provided in a multi-tenant cloud environment in which the AI conversation application facilitates conversations on behalf of multiple organizations. In another embodiment, the AI conversation application may be implemented at the organization for which it facilitates conversations (e.g., as part of an automotive retailer's computer system). An AI conversation application may also be implemented according to a variety of other architectures.

Figure 5:
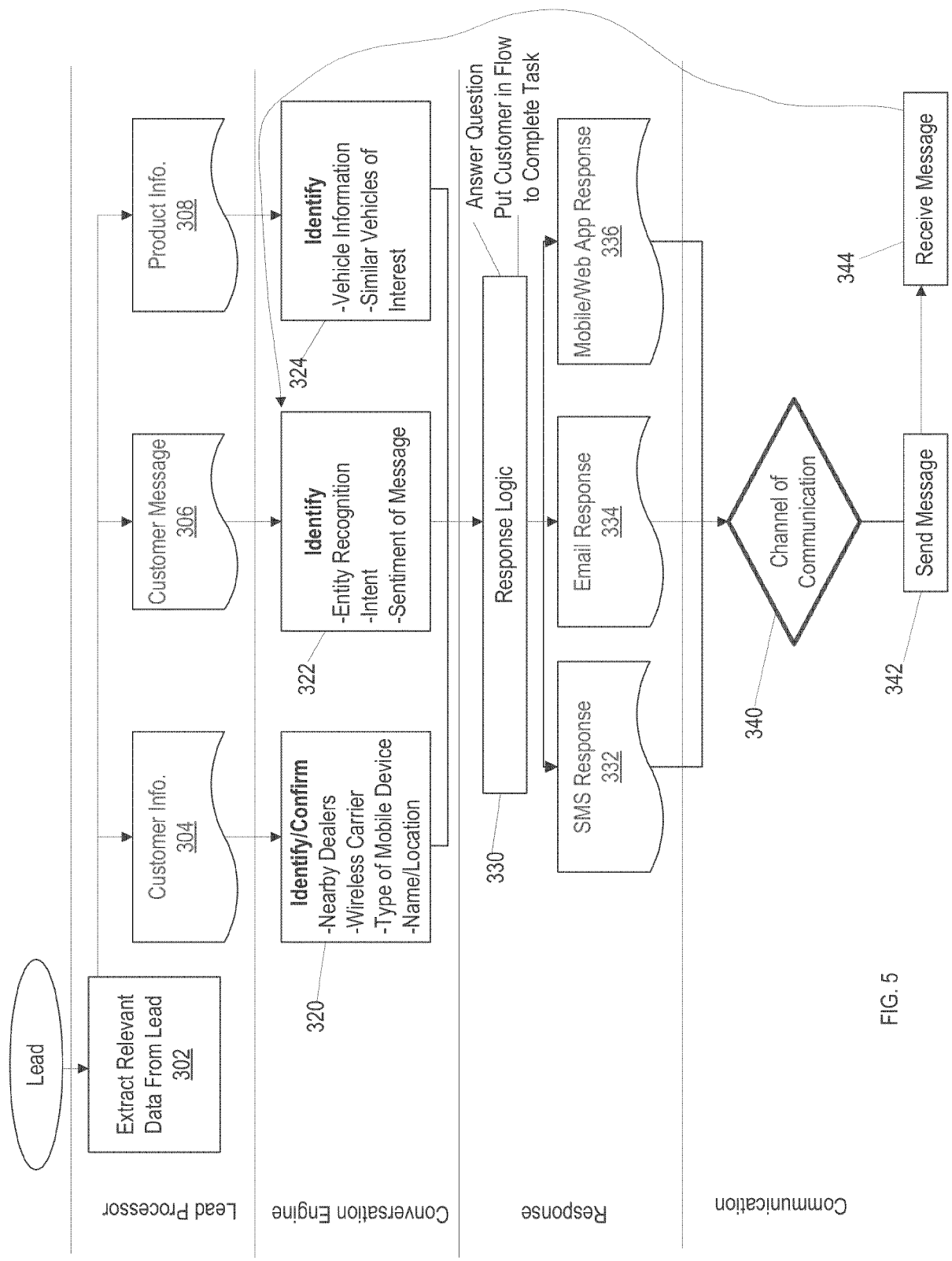
FIG. 5 is a flow chart illustrating one embodiment of processing a lead.

FIG. 5 is a flow chart illustrating one embodiment of processing a lead. At 302, a lead processor of the AI conversation application extracts data from the lead, including customer information 304, a customer written message 306 and product information 308.

At 320, the conversation engine determines, nearby dealers, the wireless carrier of the user, type of mobile device of the user, user name and user location from or based on the customer information.

At 322, the conversation engine extracts entities and intents from the written message 306. The conversation engine may also perform other operations on the written message, such as sentiment analysis.

At 324, the conversation engine may process any product information 308 provided in the message to identify vehicle information for a vehicle of interest and further to determine similar vehicles of interest.

The conversation engine may perform data lookups, update a conversation state or take other actions based the determined intent.

Response logic 330 of the conversation engine can determine a response intent from the conversation state and intent or from a response intent model. The response logic is context aware and can remember which response intents have already been processed for a conversation. The response intents can correspond to responses that answer a customer question or put the customer into a flow in which the AI conversation engine asks the customer questions to complete a task.

Based on the response intent, the response logic 330 generates an SMS response 332, email response 334 and mobile/web application response 336.

At 340, the conversation application selects a communications channel and, at 342, sends the response to the customer via the communications channel. Subsequent messages 344 in the conversation can be processed.

Figure 6:
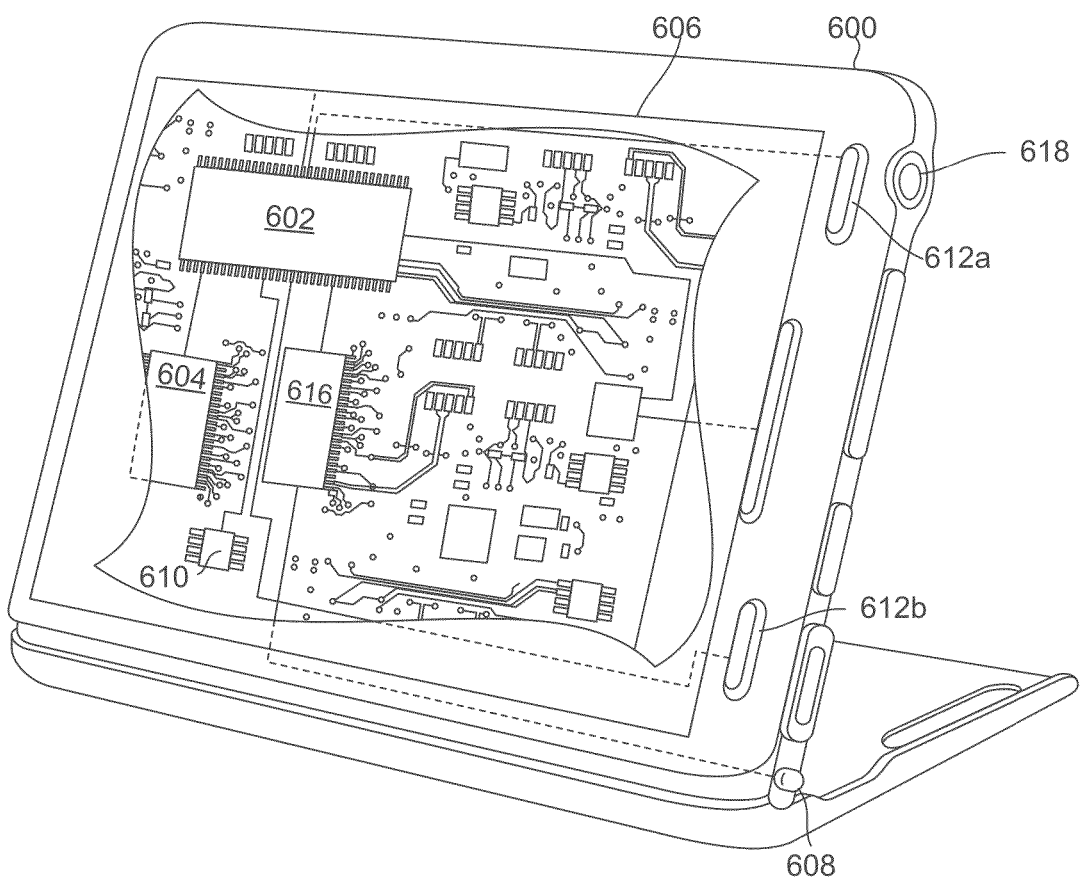
FIG. 6 is a component diagram of an example computing device suitable for use with the various embodiments.

The various embodiments may be implemented in any of a variety of computing devices, an example of which is illustrated in FIG. 6. For example, a computing device may be a mobile device 600 which may include a processor 602 coupled to internal memories 604 and 610. Internal memories 604 and 610 may be volatile or non-volatile memories, and may also be secure and/or encrypted memories, or unsecure and/or unencrypted memories, or any combination thereof. The processor 602 may also be coupled to a touch screen display 606, such as a resistive-sensing touch screen, capacitive-sensing touch screen infrared sensing touch screen, or the like. Additionally, the display of the mobile device 600 need not have touch screen capability. Additionally, the mobile device 600 may have one or more antenna 608 for sending and receiving electromagnetic radiation that may be connected to network interface, such as a wireless data link and/or cellular telephone transceiver 616, coupled to the processor 602. The mobile device 600 may also include physical buttons 612a and 612b for receiving user inputs. The mobile device 600 may also include a power button 618 for turning the mobile device 600 on and off.

Figure 7:
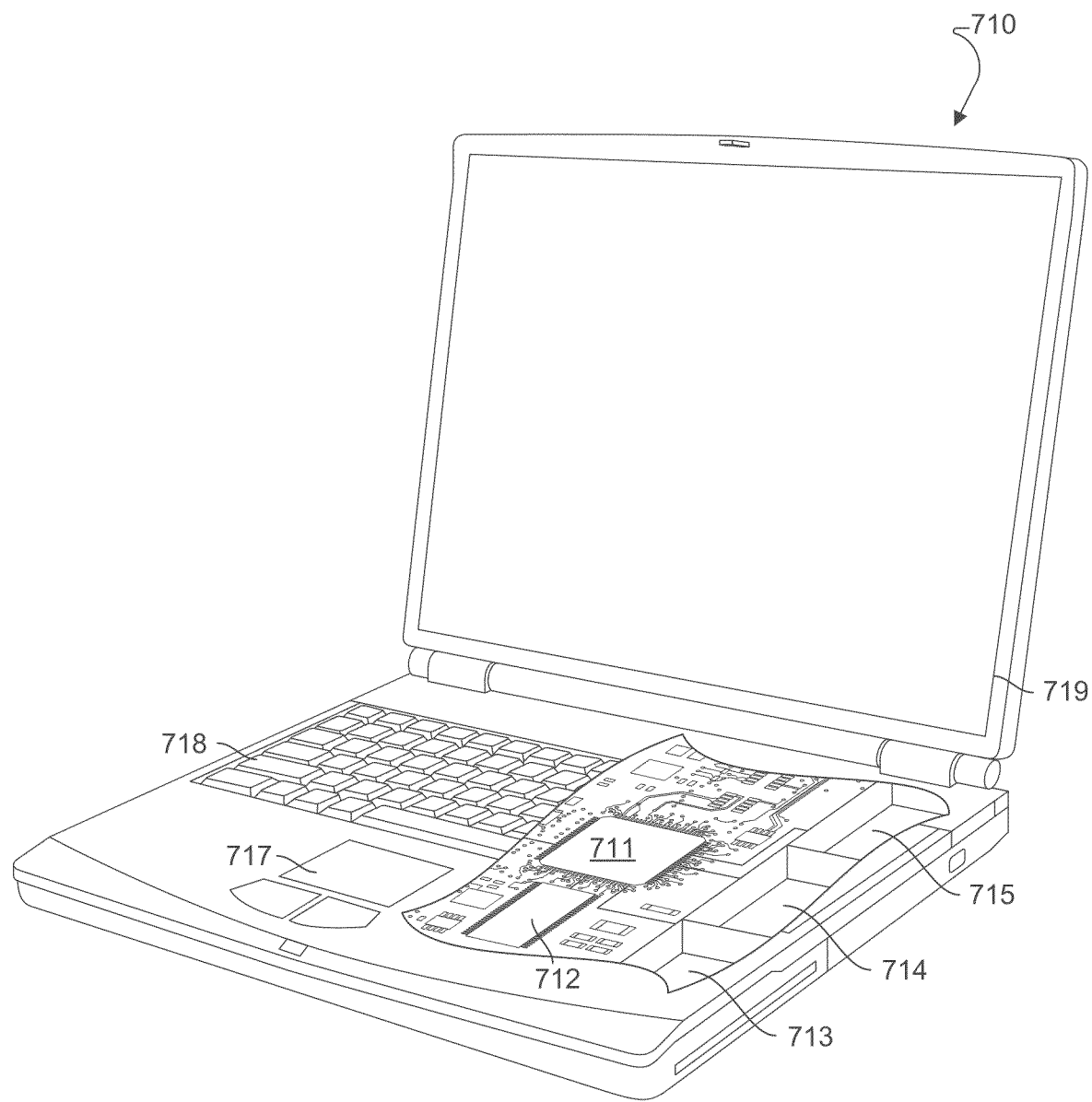
FIG. 7 is a component diagram of another example computing device suitable for use with the various embodiments.

The various embodiments described above may also be implemented within a variety of computing devices, such as a laptop computer 710 as illustrated in FIG. 7. Many laptop computers include a touch pad touch surface 717 that serves as the computer's pointing device, and thus may receive drag, scroll, and flick gestures similar to those implemented on mobile computing devices equipped with a touch screen display and described above. A laptop computer 710 will typically include a processor 711 coupled to volatile memory 712 and a large capacity nonvolatile memory, such as a disk drive 713 of Flash memory. The laptop computer 710 may also include a floppy disc drive 714 and a compact disc (CD) drive 715 coupled to the processor 711. The laptop computer 710 may also include a number of connector ports coupled to the processor 711 for establishing data connections or receiving external memory devices, such as a USB or FireWire® connector sockets, or other network connection circuits (e.g., interfaces) for coupling the processor 711 to a network. In a notebook configuration, the computer housing may include the touchpad 717, the keyboard 718, and the display 719 all coupled to the processor 711. Other configurations of the computing device may include a computer mouse or trackball coupled to the processor (e.g., via a USB input) as are well known, which may also be used in conjunction with the various embodiments.

Figure 8:
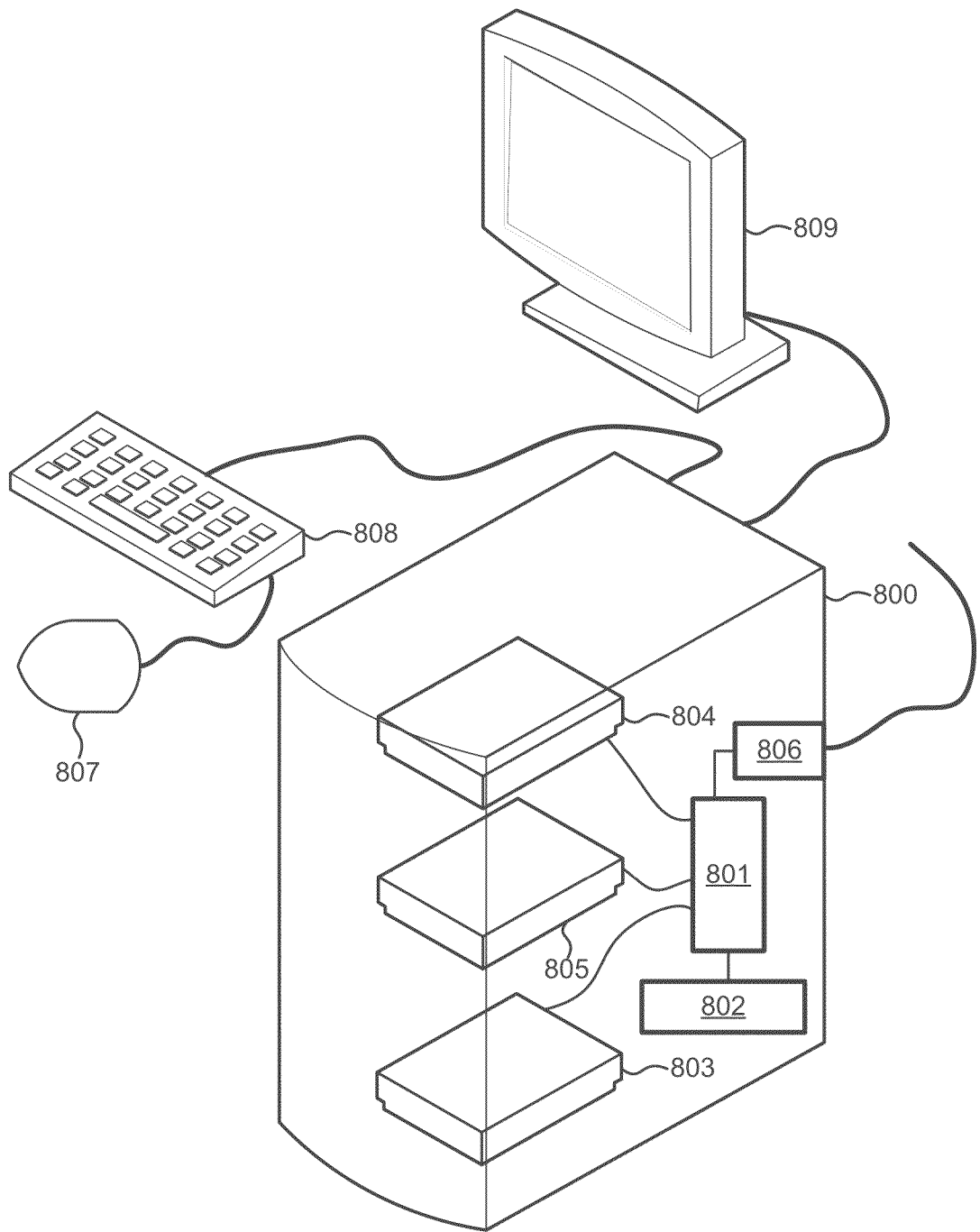
FIG. 8 is a component diagram of an additional example computing device suitable for use with the various embodiments.

The various embodiments described above may also be implemented within a variety of computing devices, such as a terminal computer (e.g., a retail terminal) 800 as illustrated in FIG. 8. A terminal computer 800 will typically include a processor 801 coupled to volatile memory 802 and a large capacity nonvolatile memory, such as a disk drive 804 of Flash memory. The terminal 800 may also include a floppy disc drive 805 and a compact disc (CD) drive 803 coupled to the processor 801. The terminal 800 may also include a number of connector ports 806 coupled to the processor 801 for establishing data connections or receiving external memory devices, such as a USB or FireWire® connector sockets, or other network connection circuits (e.g., interfaces) for coupling the processor 811 to a network. Additionally, a keyboard 808, mouse 807, and display 819 may all be coupled to the processor 801.

Figure 9:
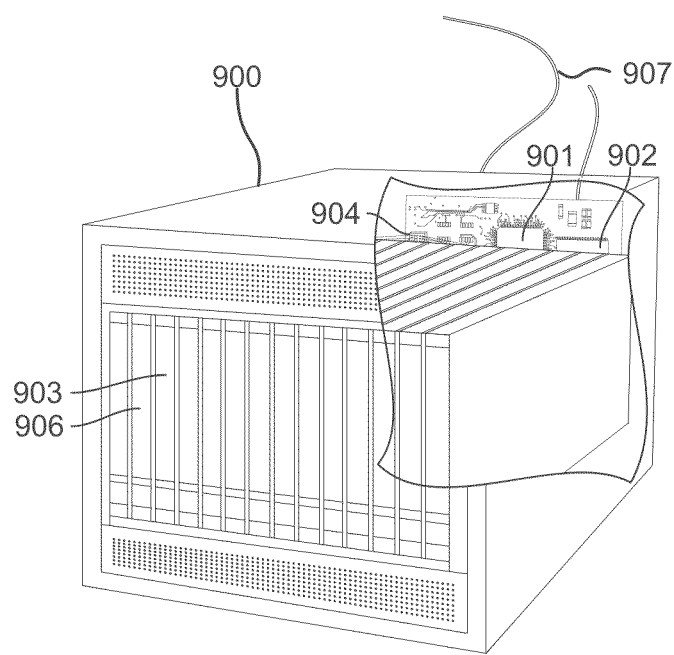
FIG. 9 is a component diagram of an example server suitable for use with the various embodiments.

The various embodiments may also be implemented on any of a variety of commercially available server devices, such as the server 900 illustrated in FIG. 9. Such a server 900 typically includes a processor 901 coupled to volatile memory 902 and a large capacity nonvolatile memory, such as a disk drive 903. The server 900 may also include a floppy disc drive, compact disc (CD) or DVD disc drive 906 coupled to the processor 901. The server 900 may also include network access ports 904 (network interfaces) coupled to the processor 901 for establishing network interface connections with a network 907, such as a local area network coupled to other computers and servers, the Internet, the public switched telephone network, and/or a cellular data network (e.g., CDMA, TDMA, GSM, PCS, 3G, 4G, 5G, LTE, or any other type of cellular data network).

The processors 602, 711, 801, and 901 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 602, 711, 801, and 901. The processors 602, 711, 801, and 901 may include internal memory sufficient to store the application software instructions. In many devices the internal memory may be a volatile or nonvolatile memory, such as flash memory, or a mixture of both. For the purposes of this description, a general reference to memory refers to memory accessible by the processors 602, 711, 801, and 901 including internal memory or removable memory plugged into the device and memory within the processor 602, 711, 801, and 901 themselves.

Embodiments of a hardware architecture for implementing certain embodiments is described herein. One embodiment can include one or more computers communicatively coupled to a network. As is known to those skilled in the art, the computer can include a central processing unit (CPU), at least one read-only memory (ROM), at least one random access memory (RAM), at least one hard drive (HD), and one or more input/output (I/O) device(s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer instructions executable (in other which can be directly executed or made executable by, for example, compilation, translation, etc.) by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Additionally, the functions of the disclosed embodiments may be implemented on computers shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment."

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for automated conversations with users by an artificial intelligence (AI) conversation system, the method comprising:
    receiving an N number of messages from a customer in a conversation, where N is a value greater than 1 and each of the N number of messages includes message text;
    for each of the N number of messages:
        applying to the received message text a topic category model that has been trained to compare a text feature vector of the message text and a set of topic category reference feature vectors determining a highest similarity topic category reference feature vector to the text feature vector;
        determining a topic category represented by the highest similarity topic category reference feature vector;
        applying to the received message text an intent model that has been trained to compare the text feature vector of the message text and a set of intent class reference feature vectors determining a highest similarity intent class reference feature vector to the text feature vector;
        determining an intent class represented by the highest similarity intent class reference feature vector;
        determining a requested intent for the message based at least in part on the message text using one or more machine learning models; and
        storing the requested intent in a dataset associated with the customer;
    receiving a new message from the customer in the conversation after receiving the N number of messages, the new message including received message text;
    extracting, from the received message text, one or more entities included in the received message text;
    determining a state of the conversation based at least in part on the new message;
    predicting information based on the extracted one or more entities and the 1 to N requested intents stored in the dataset for use in a response to the received message text; and
    constructing the response to the received message text based on the extracted one or more entities, the determined state of the conversation, the topic category, the intent class, and the predicted information.

2. The method of claim 1, wherein the extracted one or more entities comprise one or more general entities, one or more industry specific entities, or one or more learned entities.

3. The method of claim 1, further comprising:
    determining whether a state change has occurred during the conversation based at least in part on a state change rule;
    changing the conversation to a second state in response to determining that a state change has occurred; and
    constructing another response based at least in part on the extracted one or more entities and the second state of the conversation.

4. The method of claim 1, wherein the conversation comprises one or more text messages and the received message text is one or more sentences of at least one of the one or more text messages.

5. A conversation system, comprising:
    a conversation engine configured to perform operations comprising:

receiving an N number of messages from a customer in a conversation, where N is a value greater than 1 and each of the N number of messages includes message text; for each of the N number of messages:
applying to the received message text a topic category model that has been trained to compare a text feature vector of the message text and a set of topic category reference feature vectors determining a highest similarity topic category reference feature vector to the text feature vector;
determining a topic category represented by the highest similarity topic category reference feature vector;
applying to the received message text an intent model that has been trained to compare the text feature vector of the message text and a set of intent class reference feature vectors determining a highest similarity intent class reference feature vector to the text feature vector;
determining an intent class represented by the highest similarity intent class reference feature vector;
determining a requested intent for the message based at least in part on the message text using one or more machine learning models; and
storing the requested intent in a dataset associated with the customer;
receiving a new message from the customer in the conversation after receiving the N number of messages, the new message including received message text;
extracting, from the received message text, one or more entities included in the received message text;
determining a state of the conversation based at least in part on the new message;
predicting information based on the extracted one or more entities and the 1 to N requested intents stored in the dataset for use in a response to the received message text; and
constructing the response to the received message text based on the extracted one or more entities, the determined state of the conversation, the topic category, the intent class, and the predicted information.

6. The conversation system of claim 5, wherein the conversation engine is configured to perform operations such that the extracted one or more entities comprise one or more general entities, one or more industry specific entities, or one or more learned entities.

7. The conversation system of claim 5, wherein the conversation engine is configured to perform operations further comprising:
determining whether a state change has occurred during the conversation based at least in part on a state change rule;
changing the conversation to a second state in response to determining that a state change has occurred; and
constructing another response based at least in part on the extracted one or more entities and the second state of the conversation.

8. The conversation system of claim 5, wherein the conversation comprises one or more text messages and the received message text is one or more sentences of at least one of the one or more text messages.

9. A non-transitory processor-readable medium having stored thereon processor-executable instructions configured to cause a processor to perform operations comprising:
receiving an N number of messages from a customer in a conversation, where N is a value greater than 1 and each of the N number of messages includes message text;
for each of the N number of messages:
applying to the received message text a topic category model that has been trained to compare a text feature vector of the message text and a set of topic category reference feature vectors determining a highest similarity topic category reference feature vector to the text feature vector;
determining a topic category represented by the highest similarity topic category reference feature vector;
applying to the received message text an intent model that has been trained to compare the text feature vector of the message text and a set of intent class reference feature vectors determining a highest similarity intent class reference feature vector to the text feature vector;
determining an intent class represented by the highest similarity intent class reference feature vector;
determining a requested intent for the message based at least in part on the message text using one or more machine learning models; and
storing the requested intent in a dataset associated with the customer;
receiving a new message from the customer in the conversation after receiving the N number of messages, the new message including received message text;
extracting, from the received message text, one or more entities included in the received message text;
determining a state of the conversation based at least in part on the new message;
predicting information based on the extracted one or more entities and the 1 to N requested intents stored in the dataset for use in a response to the received message text; and
constructing the response to the received message text based on the extracted one or more entities, the determined state of the conversation, the topic category, the intent class, and the predicted information.

10. The non-transitory processor-readable medium of claim 9, wherein the stored processor-executable instructions are configured to cause a processor to perform operations such that the extracted one or more entities comprise one or more general entities, one or more industry specific entities, or one or more learned entities.

11. The non-transitory processor-readable medium of claim 9, wherein the stored processor-executable instructions are configured to cause a processor to perform operations further comprising:
determining whether a state change has occurred during the conversation based at least in part on a state change rule;
changing the conversation to a second state in response to determining that a state change has occurred; and
constructing another response based at least in part on the extracted one or more entities and the second state of the conversation.

12. The non-transitory processor-readable medium of claim 9, wherein the stored processor-executable instructions are configured to cause a processor to perform operations such that the conversation comprises one or more text messages and the received message text is one or more sentences of at least one of the one or more text messages.

* * * * *